United States Patent [19]

Sandahl

[11] Patent Number: 5,301,826

[45] Date of Patent: Apr. 12, 1994

[54] EXPANSION RING AND CLIP FOR USE WITH AN EXPANDABLE OVEN

[75] Inventor: Jeffrey Sandahl, Burnsville, Minn.

[73] Assignee: Alternative Pioneering Systems, Inc., Chaska, Minn.

[21] Appl. No.: 926,848

[22] Filed: Aug. 6, 1992

[51] Int. Cl.⁵ .................................................. B65D 45/16
[52] U.S. Cl. .................................... 220/4.26; 220/4.03; 220/912; 220/684; 126/151
[58] Field of Search ................ 99/330, 340, 447, 476; 403/381, 374, 329, 330, 326; 220/4.03, 4.26, 4.33, 4.08, 4.09, 912, 684, 693; 126/151

[56] References Cited

U.S. PATENT DOCUMENTS

| | | | |
|---|---|---|---|
| D. 258,409 | 3/1981 | Nattrass | 220/4.33 |
| 1,293,549 | 2/1919 | Reid | 220/4.33 |
| 1,601,180 | 9/1926 | Lindgren | 220/4.09 |
| 3,179,277 | 4/1965 | Olson et al. | 220/4.03 |
| 4,699,291 | 10/1987 | Prais et al. | 220/4.33 |
| 5,087,106 | 2/1992 | Betts | 403/329 |
| 5,165,328 | 11/1992 | Erickson et al. | 99/330 |

FOREIGN PATENT DOCUMENTS 545936  3/1956  Belgium ........................... 220/4.33

Primary Examiner—Allan N. Shoap
Assistant Examiner—S. Castellano
Attorney, Agent, or Firm—Merchant, Gould, Smith, Edell, Welter & Schmidt

[57] ABSTRACT

An expansion ring for expanding the size of an oven is disclosed. The expansion ring has a plurality of expansion ring segments which are connected together by one or more clips. The expansion ring segments have end portions which, when two segments are placed in end-to-end relation, form an engagement portion having first and second stops. The clip has a channel which engages the engagement portion so as to hold the expansion ring segments together and a finger projecting into the channel. According to this arrangement, the clip is slidable between a first position where the finger engages the first stop and a second position where the finger engages the second stop. In the first position, the expansion ring segments are locked together. In the second position, the segments may be separated, but the clip remains attached to one of the segments so that it will not be lost. An oven incorporating the expansion rings and clips of the present invention is also disclosed.

29 Claims, 4 Drawing Sheets

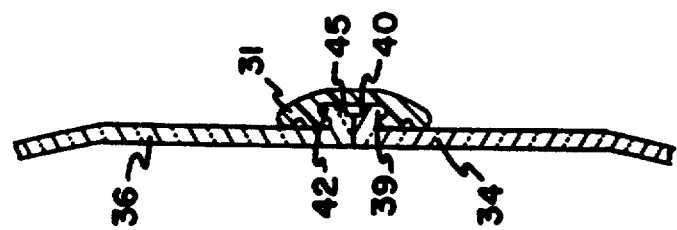
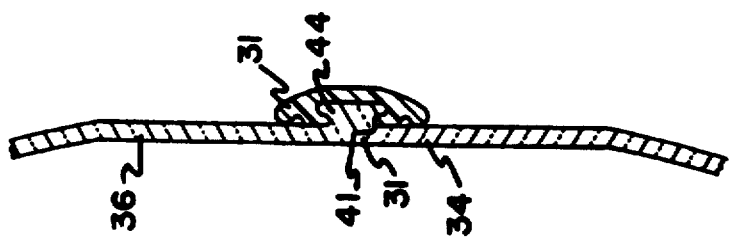
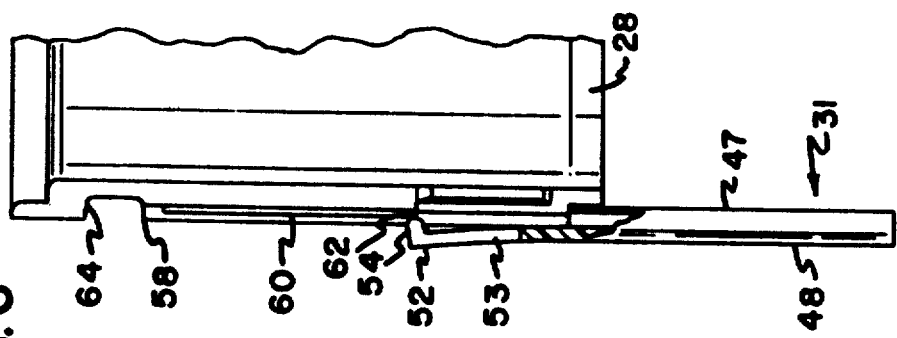

EXPANSION RING AND CLIP FOR USE WITH AN EXPANDABLE OVEN

BACKGROUND OF THE INVENTION

The present invention relates generally to a multi-piece expansion ring used to expand the size of a portable oven, and to a unique clip used to hold the pieces of the expansion ring together. More specifically, the present invention relates to such an expansion ring/clip combination which securely holds the expansion ring segments together, but allows for easy disassembly of the expansion ring for cleaning and storage.

The concept of using expansion rings to increase the cooking capacity of a portable oven is disclosed in U.S. application Ser. No. 325,157 filed Mar. 17, 1989 and assigned to the same assignee as the present invention. The present invention it is particularly useful with the oven disclosed in Ser. No. 325,157. To the extent that the disclosure of that application is necessary to an understanding of the present invention, it is incorporated by reference herein.

It is desirable for a number of reasons to form an expansion ring out of two or more segments. Such a multi-segment design is easier to manufacture. It is also more compact for shipping and storage purposes, and is easier for the user to clean.

When such a multi-piece extension ring is used, some means must be provided to connect the segments together. One such means which is known is the clip shown in FIG. 1. This clip, which is made of aluminum, has a generally planar front face 2 and a rounded back face 4. A slot 6 is formed along the front face of the clip. The expansion ring segments (not shown) have projections extending along the free ends thereof. The projections are shaped so that when two expansion ring segments are placed together, the projections of the two segments together form a shape generally the same as that of slot 6. Thus, the clip can be slid over the two projections so as to hold the segments together.

The clip of FIG. 1 suffers from numerous disadvantages. Several disadvantages result from the use of aluminum for the clip. One, aluminum has high thermal conductivity. Thus, when the oven is heated up, the clips tend to heat up quickly and retain that heat. These hot clips are potentially dangerous to the user, who can be burned.

Two, the expansion ring segments are made of plastic, which has a different thermal expansion rate than the aluminum of the clips. Thus, when the oven is used, the plastic expansion ring segments expand faster than the clips. This causes great stress to be placed on the projections, which can crack under the pressure.

Another related problem is that the only thing holding the clip in place is friction. If the clip is designed to fit tightly on the projections so as to remain securely in place, then the cracking problem referred to in the previous paragraph is particularly troublesome. One the other hand, if the clip is designed to only loosely fit over the projections, the clip is not held securely, and has a tendency to fall off.

One solution which has been suggested is shown in FIG. 2. The only difference between the clip of FIG. 2 and that of FIG. 1 is the use of two small bumps 8 located within space 6. The bumps are designed to co-operate with two small detents located on the projections of the expansion ring segments.

However, this clip, which is also made of aluminum, still suffers from disadvantages. Importantly, when the clip is slid on and off numerous times, the metal bumps on the clip eventually form a groove in the softer plastic of the expansion ring segments. This loosens the fit of the clip on the projections, so that eventually the bumps and detents would cease to served any function.

Finally, the aluminum clips shown in FIGS. 1 and 2 are very labor intensive, and thus expensive, to produce.

SUMMARY OF THE INVENTION

The present invention includes an expansion ring having a plurality of expansion ring segments connected together by at least one clip. The expansion ring segments have end portions which, when two segments are placed in end-to-end relation, form an engagement portion having a first stop. The clip is designed to engage the engagement portion so as to hold the expansion ring segments together. A finger is formed on the clip which engages the first stop so as to hold the clip in the engaged position.

The clip preferably has a channel portion which forms a channel extending along the length of the clip. The channel portion is C-shaped in longitudinal cross-section. The engagement portion is shaped so as to fit within the channel. Thus, when two expansion ring segments are fit together, the clip can be slid over the engagement portion so as to lock the segments together.

The engagement portion preferably has a second stop, and a sliding surface located between the first and second stops. According to this arrangement, the clip is slidable between a first position where the finger engages the first stop and a second position where the finger engages the second stop. In the first position, the expansion ring segments are locked together. In the second position, the segments may be separated, but the clip remains attached to one of the segments so that it will not be lost. In between the first and second positions, the finger presses against the sliding surface, providing a frictional resistance which results in smooth movement between the two positions.

The clip is preferably made of plastic. Such a plastic clip is easy and inexpensive to manufacture. It is also less damaging to the expansion ring segments, which are also made of plastic. The plastic has a low thermal conductivity, so it is less likely that the user will be burned during use of the oven. Finally, because the finger of the clip is plastic, it can be easily deformed by the user so as to disengage the finger from the first and second stops.

The invention also includes an oven which employs such an expansion ring and clips.

BRIEF DESCRIPTION OF THE DRAWINGS

The preferred embodiment will be described in detail with reference to the attached drawings, in which:

FIG. 6 is a side view of one end portion of the expansion ring segments shown in FIG. 3, with the clip, shown partially broken away, in the unsecured position;

FIG. 8 is a cross-sectional view taken along lines 8—8 in FIG. 3; and

FIG. 9 is a cross-sectional view taken along lines 9—9 in FIG. 3.

DETAILED DESCRIPTION OF THE PREFERRED EMBODIMENT

Figure 1:
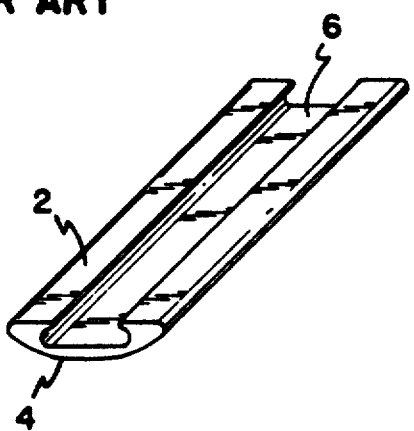
FIGS. 1 and 2 are perspective views of two prior art clips.
Figure 2:
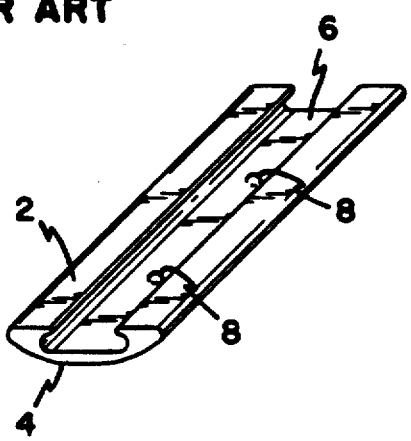
Figure 3:
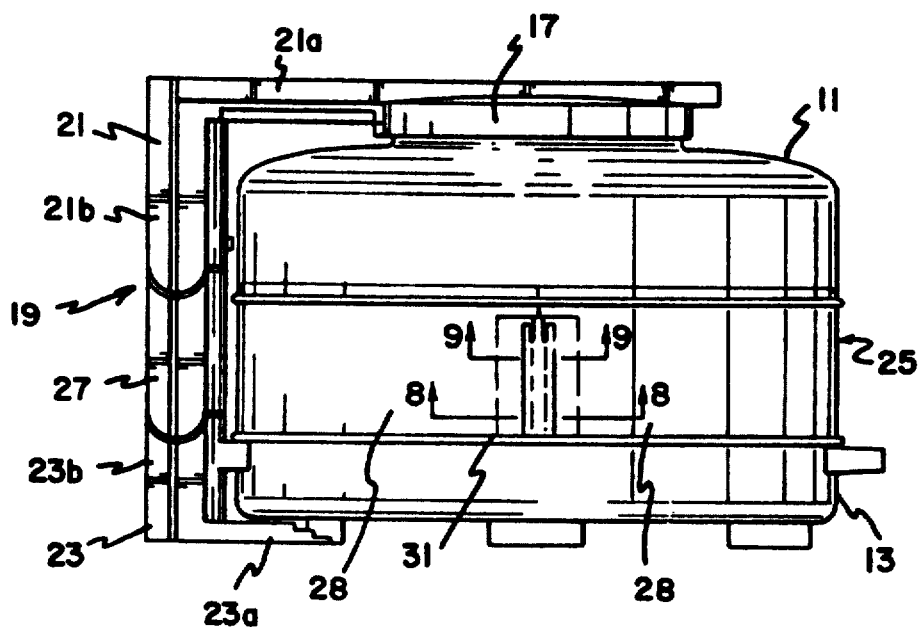
FIG. 3 is a side view of an expandable oven employing an expansion ring and clips according to the preferred embodiment.

An oven employing an embodiment of the expansion ring of the present invention is shown in FIG. 3. This oven is disclosed in Ser. No. 325,157, which is incorporated herein by reference.

As shown in FIG. 3, the oven preferably has an upper enclosure member 11 and a lower enclosure member 13 which define a cooking chamber. The cooking chamber is generally circular in horizontal cross-section and ovular in vertical cross-section. A rack (not shown) is provided within the lower enclosure member for supporting the food to be cooked. A housing 17 is fitted in an opening in the upper enclosure member. The housing contains a heating element (not shown) and a fan blade/motor assembly (not shown). As explained in further detail in Ser. No. 325,157, the heating fan blade moves the air at a high velocity within the cooking chamber, causing the food to be quickly and evenly cooked.

The oven preferably includes an interconnecting member 19 which connects the upper and lower enclosure members together. The interconnecting member is made up of an upper support portion 21 and a lower support portion 23. Upper support portion 21 has a horizontal leg 21a, which is connected to housing 17, and a vertical leg 21b. Likewise, the lower support portion has a horizontal leg 23a and a vertical leg 23b. The horizontal leg rests on the supporting counter top or table, and can connect to one of the feet of the oven. The vertical legs 21b and 23b cooperate as a hinge to allow the upper enclosure member to pivoted upwardly to allow access to the interior of the oven.

In order to expand the size of the cooking chambers, an expansion ring such as 25 is placed between the upper and lower closure members. An expansion spacer 27 is placed between upper and lower support portions 21 and 23 so as to increase the height of the interconnecting member as well.

Figure 4:
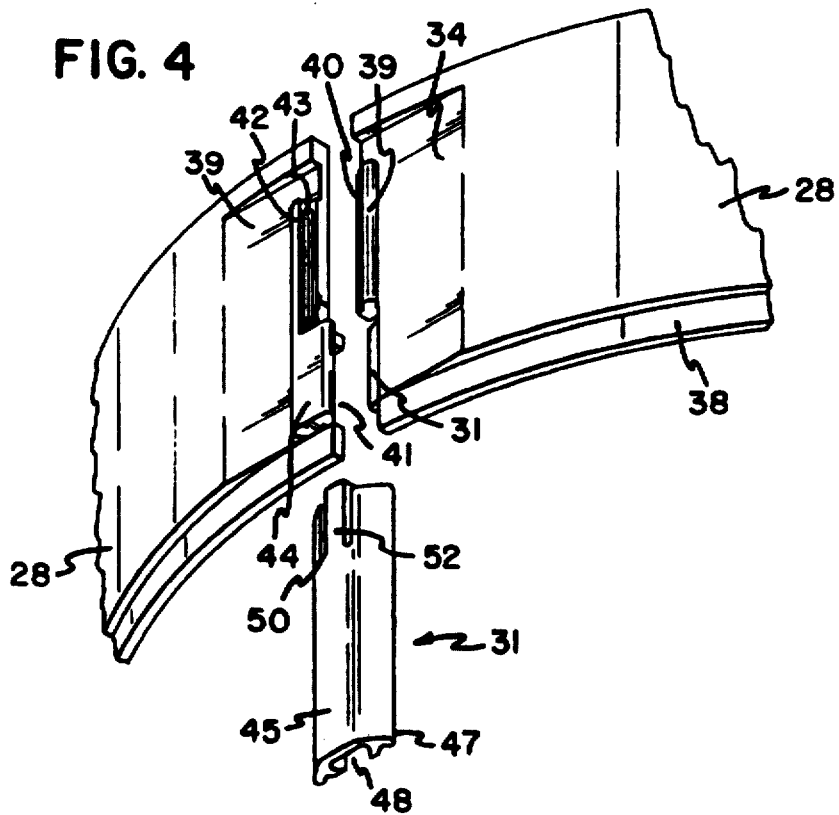
FIG. 4 is an exploded perspective view of the end portions of the expansion ring segments shown in FIG. 3.

Expansion ring 25 is shown in greater detail in FIG. 4. The expansion ring is preferably made up of two expansion ring segments 28 and two clips 31. The expansion ring segments are preferably identical, each being generally semi-circular in horizontal cross-section. Located along one edge of the expansion ring segments is a stepped portion 38. This stepped portion is designed so that the upper enclosure member rests on the stepped portion, so as to hold the upper enclosure member securely and stably on the expansion ring.

Each expansion ring segment has a first end portion 34 and a second end portion 36 (only one end portion of each expansion ring segment is shown in FIG. 4). The first and second end portions are planar on both their inner and outer faces. First end portion 34 has a lug 39 on the outer flat face thereof and a projection 31 projecting from the edge surface. Lug 39 has a stepped portion 40 (see FIG. 9). Second end portion 36 has a lug 42 which is substantially identical to the lug 39 on the first end portion. Lug 42 also has a stepped portion 43 (FIG. 9). Formed integrally with lug 42 on the second end portion is a second lug 44. Lug 44 is wider than lugs 39 and 42 and is flat on its outer surface. A notch 41 is located behind the second lug.

Clip 31 has a rounded outer surface 45 and a substantially planar inner surface 47. A channel 48 extends along the length of the clip. The channel is substantially C-shaped in cross-section. A notch 50 is located in the outer surface of the clip at one end thereof. Within the notch is a substantially L-shaped finger 52. One leg 53 of the L-shaped finger extends generally in parallel to the outer surface 45 of the clip and projects just past the outer surface. The other leg 54 of the L-shaped finger projects just past the end of channel 48 (see FIGS. 6 and 7).

Figure 5:
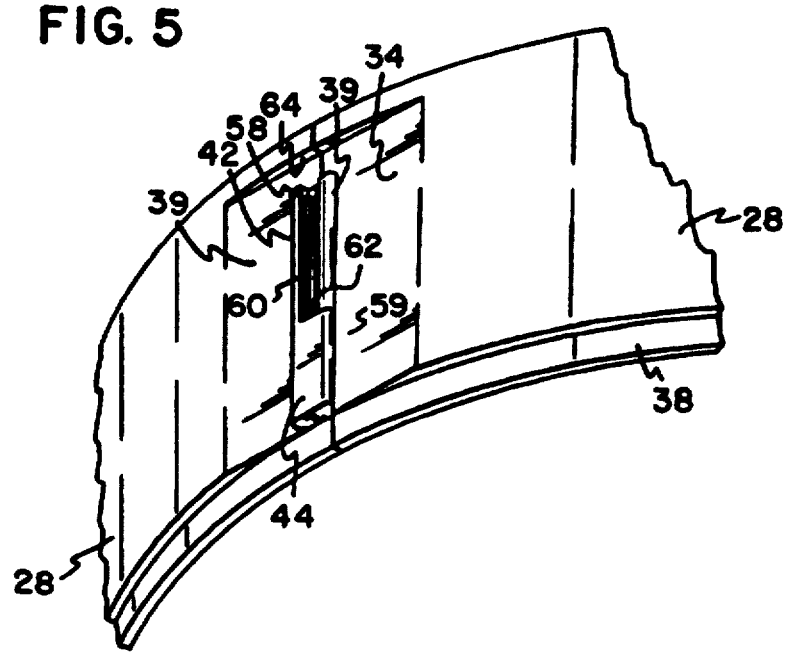
FIG. 5 is a perspective view of the end portions of the expansion ring segments shown in FIG. 3.

The end portions 34 and 36 of the expansion ring segments are designed to mate together as shown in FIG. 5. In the mated position, projection 41 of the first end portion fits within notch 44 of the second end portion (see FIG. 8). Furthermore, lugs 39, 42 and 44 cooperate to form an engagement portion 56. The engagement portion is shaped to fit securely within channel 48 of the clip. A first stop 58 is formed by the ends of lugs 39 and 42 A sliding surface 60 is formed by the two stepped portions 40 and 43. A second stop 62 is formed at the junction between the sliding surface and second lug 44.

Figure 7:
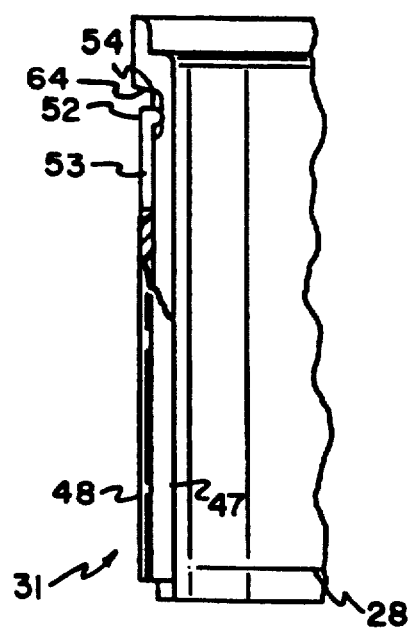
FIGS. 7 is a side view similar to FIG. 6, but showing the clip in the secured position.

The manner in which clip 31 cooperates with the engagement portion 56 will be described with reference to FIGS. 6–7. So that the interaction of the clip and the engagement portion can be seen clearly, only one of the expansion ring segments is shown in FIGS. 6–7. However, it is understood that the clip is designed to engage two expansion ring segments mated together as shown in FIG. 5.

The clip is shown in the unsecured position in FIG. 6. In this position, lug 44 is securely held with the channel of the clip. Finger 52 engages stop 62 so as to prevent the clip from sliding up. In this position, the expansion ring segments are not connected together, since the channel of clip 31 has engaged only lug 44, and not lugs 39 and 42. However, because stop 62 prevents the clip from sliding upwardly, the clip remains attached to one of the expansion ring segments, thus reducing the chance that the clip will be lost during shipping, storage, cleaning, etc. If it is necessary to completely removed the clip from the expansion ring segment, finger 52 can be bent back manually, thus disengaging the finger from stop 62. Once disengaged, the clip can be slid up and off of the engagement portion.

To secure the two expansion ring segments together, the clip is slid down over the two lugs 39 and 42. As the clip is slid downwardly, lugs 39 and 42 and engaged by the channel 48. Furthermore, finger 52 presses against sliding surface 60 so as to provide smooth movement between the secured and unsecured positions.

The clip is shown in the secured position in FIG. 7. In this position, finger 52 is located past the end of the engagement portion 56 so as to engage the first stop 58. Once engaged with the first stop, the clip is locked onto the engagement portion, and will not slide off accidentally. The channel grips the two lugs 39 and 42 together so as to securely hold the expansion ring segments together. Ledge 64 located along the lower edge of end portions 34 and 36 prevent the clip from sliding downwardly.

To disconnect the expansion ring segments, one simply lifts up on finger 52 and slides the clip back to the position shown in FIG. 6.

The expansion ring segments are made out of a high temperature plastic, preferably PAS (Poly Aryl Sulfone). The clips are also made out of plastic, preferably of a material sold by DuPont under the name Zytel. The clips can be made cheaply and easily by, for example, injection molding. The plastic material ensures that the finger 52 is easily bendable, allowing the finger to be manually lifted out of engagement with the stops on the engagement portion. The plastic clips are also preferable because their low thermal conductivity allows the clips to stay cool during use of the oven. Also because the clips and expansion ring segments are made out of material with similar thermal expansion rates, the channel can be sized to fit snugly on the engagement portion, without fear that the engagement portion will bind or crack when the oven is heated up.

The foregoing constitutes a detailed description of the preferred embodiment of the oven, expansion ring, and clips of the present invention. However, the invention is not limited to the preferred embodiment. Numerous changes are possible without departing from the spirit and scope of the invention. For example, the oven and expansion rings need not be circular, but can be of any desirable shape. More than two expansion ring segments may be used. The size, shape, and arrangement of many parts may be changed. Thus, the scope of the invention should be defined with reference not to the preferred embodiment, but to the following claims.

I claim:

1. An expansion ring for use in expanding the cooking capacity of an oven, comprising:
    a plurality of expansion ring segments, said expansion ring segments each having two end portions and being removably fitted in end-to-end relation so as to form a ring, wherein when fitted in end-to-end relation, the end portions of two adjacent expansion ring segments form an engagement portion having a first stop; and
    at least one clip, said clip being removably engagable with said engagement portion so as to connect said end portions of said two adjacent expansion ring segments together, said clip having a resilient finger which is biased toward the engagement portion, wherein the finger engages said stop so as to prevent said clip from moving freely relative to said engagement portion.

2. The expansion ring as claimed in claim 1, wherein said clip has a channel portion which defines a channel extending along the clip, said finger being located at one end of said channel.

3. The expansion ring as claimed in claim 2, wherein said channel portion is substantially C-shaped in longitudinal cross-section.

4. The expansion ring as claimed in claim 3, wherein said engagement portion is shaped to slide within said channel.

5. The expansion ring as claimed in claim 2, wherein said engagement portion comprises two lugs, each of said lugs being formed on one of said end portions of said two adjacent expansion ring segments.

6. The expansion ring as claimed in claim 5, wherein said two lugs are substantially identical, and wherein said lugs, when mated together, slidably engage with said channel.

7. The expansion ring as claimed in claim 1, wherein said clip is made of plastic.

8. The expansion ring as claimed in claim 1, comprising a plurality of said engagement portions, each of said engagement portions being formed by the end portions of two adjacent expansion ring segments, said expansion ring further comprising a plurality of said clips, each of said plurality of clips being removably engagable with one of said engagement portions.

9. The expansion ring as claimed in claim 1, wherein the finger is substantially L-shaped.

10. The expansion ring as claimed in claim 1, wherein the clip comprising a front face, a back face, and a channel extending along the front face, and wherein the finger comprises a first arm which extends substantially parallel to the channel and a second arm which engages the stop.

11. The expansion ring as claimed in claim 10, wherein the second arm of said finger projects across an end of the channel.

12. The expansion ring as claimed in claim 10, wherein the back face of said clip has a notch formed therein, and wherein the first arm of said finger is located within the notch.

13. The expansion ring as claimed in claim 12, wherein the second arm of said finger projects across an end of the channel.

14. An expandable oven, comprising:
    an upper enclosure member and a lower enclosure member, said upper and lower enclosure members fitting together to define a cooking chamber having a height;
    an expansion ring for increasing the height of said cooking chamber, comprising:
        a plurality of expansion ring segments, said expansion ring segments each having two end portions and being removably fitted in end-to-end relation so as to form a ring, wherein when fitted in end-to-end relation, the end potions of two adjacent expansion ring segments form an engagement portion having a first stop; and
        at least one clip, said clip being removably engagable with said engagement portion so as to connect said end portions of said two adjacent expansion ring segments together, said clip having a resilient finger which is biased toward the engagement portion, wherein the finger engages said stop so as to prevent said clip from moving freely relative to said engagement portion.

15. The oven as claimed in claim 14, wherein said clip has a channel portion which defines a channel extending along the clip, said finger being located at one end of said channel.

16. The oven as claimed in claim 14, wherein expansion ring segments and said clip are made of plastic.

17. The oven as claimed in claim 14, comprising a plurality of said engagement portions, each of said engagement portions being formed by the end portions of two adjacent expansion ring segments, said expansion ring further comprising a plurality of said clips, each of said plurality of clips being removably engagable with one of said engagement portions.

18. The oven as claimed in claim 17, wherein the finger is substantially L-shaped.

19. The oven as claimed in claim 14, wherein the clip comprises a front face, a back face, and a channel extending along the front face, and wherein the finger comprises a first arm which extends substantially parallel to the channel and a second arm which engages the stop.

20. The oven as claimed in claim 19, wherein the second arm of said finger projects across an end of the channel.

21. The oven as claimed in claim 19, wherein the back face of said clip has a notch formed therein, and wherein the first arm of said finger is located within the notch.

22. The oven as claimed in claim 21, wherein the second arm of said finger projects across an end of the channel.

23. An expansion ring for use in expanding the cooking capacity of an oven, comprising:
- a plurality of expansion ring segments, said expansion ring segments each having two end portions and being removably fitted in end-to-end relation so as to form a ring, wherein when fitted in end-to-end relation, the end portions of two adjacent expansion ring segments form an engagement portion having a first stop and a second stop; and
- at least one clip, said clip being removably engagable with said engagement portion so as to connect said end portions of said two adjacent expansion ring segments together, said clip having a finger which engages said first stop so as to prevent said clip from moving freely relative to said engagement portion;
- wherein said clip is slidable between a first position where said finger engages said first stop and a second position wherein said finger engages said second stop, wherein when said clip is in said first position, said clip holds said end portions of said two adjacent expansion ring segments together, and wherein when said clip is in the second position, said clip does not hold said end portions of said two adjacent expansion ring segments together.

24. The expansion ring as claimed in claim 23, wherein when said clip is in said second position, said clip remains engaged with one of said end portions of said two adjacent expansion ring segments.

25. The expansion ring as claimed in claim 23, wherein said engagement portion comprises a sliding surface located between said first and second stops, and wherein when said clip is moved between said first and said second positions, said finger presses against said sliding surfaces so as to provide frictional resistance to movement.

26. The expansion ring for use in expanding the cooking capacity of an oven, comprising:
- a plurality of expansion ring segments, said expansion ring segments each having two end portions and being removably fitted in end-to-end relation so as to form a ring, wherein when fitted in end-to-end relation, the end portions of two adjacent expansion ring segments form an engagement portion having a first stop; and
- at least one clip, said clip being removably engagable with said engagement portion so as to connect said end portions of said two adjacent expansion ring segments together, said clip having a channel portion which defines a channel extending along the clip and a finger located at one end of the channel which engages said stop so as to prevent said clip from moving freely relative to said engagement portion;
- wherein said engagement portion comprises two substantially identical lugs, each of said lugs being formed on one of said end portions of said two adjacent expansion ring segments, which when mated together, slidably engage with said channel; and
- wherein said engagement portion further comprises a third lug formed on one of said end portions of said two adjacent expansion ring segments, said third lug being slidably engagable with said channel.

27. An expandable oven, comprising:
- an upper enclosure member and a lower enclosure member, said upper and lower enclosure members fitting together to define a cooking chamber having a height;
- an expansion ring for increasing the height of said cooking chamber, comprising:
  - a plurality of expansion ring segments, said expansion ring segments each having two end portions and being removably fitted in end-to-end relation so as to form a ring, wherein when fitted in end-to-end relation, the end portions of two adjacent expansion ring segments form an engagement portion having a first stop and a second stop; and
  - at least one clip, said clip being removably engagable with said engagement portion so as to connect said end portions of said two adjacent expansion ring segments together, said clip having a finger which engages said first stop so as to prevent said clip from moving freely relative to said engagement portion;
- wherein said clip is slidable between a first position where said finger engages said first stop and a second position wherein said finger engages said second stop, wherein when said clip is in said first position, said clip holds said end portions of said two adjacent expansion ring segments together, and wherein when said clip is in the second position, said clip does not hold said end portions of said two adjacent expansion ring segments together.

28. The oven as claimed in claim 27, wherein when said clip is in said second position, said clip remains engaged with one of said end portions of said two adjacent expansion ring segments.

29. The oven as claimed in claim 27, wherein said engagement portion comprises a sliding surface located between said first and second stops, and wherein when said clip is moved between said first and second positions, said finger presses against said sliding surface so as to provide frictional resistance to movement.

* * * * *